(12) United States Patent
Manwaring et al.

(10) Patent No.: US 7,574,941 B2
(45) Date of Patent: Aug. 18, 2009

(54) ADJUSTABLE STEERING COLUMN ASSEMBLY HAVING A RAKE AND TELESCOPE LOCKING SYSTEM

(75) Inventors: Marvin V. Manwaring, Clio, MI (US); Ravi Ravindra, Saginaw, MI (US); Melvin L. Tinnin, Clio, MI (US); Albert C. Huber, Montrose, MI (US)

(73) Assignee: Delphi Technologies, Inc., Troy, MI (US)

( * ) Notice: Subject to any disclaimer, the term of this patent is extended or adjusted under 35 U.S.C. 154(b) by 173 days.

(21) Appl. No.: 11/801,546

(22) Filed: May 10, 2007

(65) Prior Publication Data

US 2008/0196536 A1 Aug. 21, 2008

Related U.S. Application Data

(60) Provisional application No. 60/890,756, filed on Feb. 20, 2007.

(51) Int. Cl.
*B62D 1/16* (2006.01)
(52) U.S. Cl. ............... 74/492; 74/493; 280/775
(58) Field of Classification Search ............ 74/492, 74/493; 280/775, 777
See application file for complete search history.

(56) References Cited

U.S. PATENT DOCUMENTS

| | | | | |
|---|---|---|---|---|
| 5,823,062 A | * | 10/1998 | Snell et al. | 74/493 |
| 6,139,057 A | * | 10/2000 | Olgren et al. | 280/775 |
| 6,408,985 B1 | * | 6/2002 | Orlitzky et al. | 184/37 |
| 6,419,269 B1 | | 7/2002 | Manwaring et al. | |
| 6,616,185 B2 | | 9/2003 | Manwaring et al. | |
| 6,659,504 B2 | * | 12/2003 | Riefe et al. | 280/777 |
| 6,695,349 B2 | * | 2/2004 | Bohlen et al. | 280/775 |
| 2006/0033319 A1 | | 2/2006 | Tinnin et al. | |

* cited by examiner

*Primary Examiner*—David M Fenstermacher
(74) *Attorney, Agent, or Firm*—Thomas N. Twomey

(57) ABSTRACT

A steering column assembly is moveable in a rake direction and a telescope direction and extends along a longitudinal axis. The assembly includes a compression bracket mounted to a column jacket. A rake bracket is disposed over the compression bracket. The rake bracket defines a rake slot and includes a rake tooth rack disposed in the rake slot. The compression bracket defines a telescoping slot and includes a telescope tooth rack disposed in the telescope slot. A telescoping lock is disposed within the telescoping slot. A rake lock is disposed within the rake slot. A cam mechanism moves the rake lock into interlocking engagement with the rake tooth rack and moves the telescope lock into interlocking engagement with the telescope tooth rack when in the lock position, and disengages the rake lock from the rake tooth rack and the telescope lock from the telescope tooth rack when in the adjustment position.

22 Claims, 9 Drawing Sheets

ADJUSTABLE STEERING COLUMN ASSEMBLY HAVING A RAKE AND TELESCOPE LOCKING SYSTEM

CROSS REFERENCE TO RELATED APPLICATION

This application claims the benefit of U.S. application Ser. No. 60/890,756 filed on Feb. 20, 2007, the disclosure of which is herein incorporated by reference.

BACKGROUND OF THE INVENTION

1. Field of the Invention

The subject invention generally relates to a steering column assembly for a vehicle, and more specifically to a steering column assembly adjustable in both a rake direction (tilt) and a telescope direction.

2. Description of the Prior Art

Typically, steering column assemblies adjustable in a rake direction and a telescoping direction rely on a friction locking system to maintain a selected position of adjustment during normal operation. However, the friction locking system does not provide a positive mechanical lock preventing movement in the rake direction and the telescope direction under extreme impact conditions. It is important to maintain the selected position of adjustment during the extreme impact conditions to optimize the operation of an energy absorption device incorporated into the steering column assembly, which absorbs energy transmitted through the steering column assembly.

Accordingly, positive mechanical locking systems have been incorporated into the adjustable steering column assemblies to maintain the selected position of adjustment during the extreme impact conditions. U.S. Pat. No. 6,616,185, Ser. No. 10/177,182, discloses a steering column assembly having a locking system of interlocking teeth to maintain the selected position of adjustment during the extreme impact conditions. The interlocking teeth are in a disengaged position during normal operation of the vehicle and move into an engaged position during an extreme impact condition to positively lock the rake adjustment and the telescopic adjustment of the steering column assembly. However, there is still some movement of the steering column assembly in both the rake direction and the telescope direction as the interlocking teeth move from the disengaged position into the engaged position.

SUMMARY OF THE INVENTION AND ADVANTAGES

The subject invention provides a steering column assembly for a vehicle. The steering column assembly comprises a support bracket for attachment to the vehicle. A column jacket is coupled to the support bracket and extends along a longitudinal axis. The column jacket is pivotably moveable relative to the support bracket about a rake axis. A compression bracket is mounted to the column jacket and defines a telescope slot parallel to the longitudinal axis. A telescope tooth rack is disposed in the telescope slot. A rake bracket is coupled to the compression bracket and defines a rake slot transverse to the longitudinal axis. The rake slot is spaced across the column jacket from the telescope slot and is generally perpendicular relative to the telescope slot. A rake tooth rack is disposed in the rake slot. A rake bolt extends transversely relative to the longitudinal axis through the rake slot and the telescope slot. The rake bolt is moveable between a lock position and an adjustment position. A rake lock is disposed in the rake slot and is moveable with the rake bolt between the lock position and the adjustment position. The rake slot includes a plurality of rake teeth in interlocking engagement with the rake tooth rack when in the lock position and in disengagement with the rake tooth rack when in the adjustment position. A telescope lock is disposed in the telescope slot and is moveable with the rake bolt between the lock position and the adjustment position. The telescope lock includes a plurality of telescope teeth in interlocking engagement with the telescope tooth rack when in the lock position and in disengagement with the telescope tooth rack when in the adjustment position. A cam mechanism is coupled to the rake bolt and manipulates the movement of the rake bolt for simultaneously moving the rake lock along the longitudinal axis and the telescope lock transverse to the longitudinal axis.

Accordingly, the subject invention provides a steering column assembly that is adjustable in a rake direction and a telescope direction when in the adjustment position, and which is positively locked against any movement when in the lock position. Because of the continuous interlocking engagement of the rake teeth of the rake lock and the rake tooth rack, along with the continuous interlocking engagement of the telescope teeth of the telescoping lock and the telescoping tooth rack at all times when in the lock position, the steering column assembly will maintain a selected position of adjustment without any slippage, even during a high impact condition. Additionally, the steering column assembly does not need to rely on a friction locking system to hold the selected position of adjustment.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
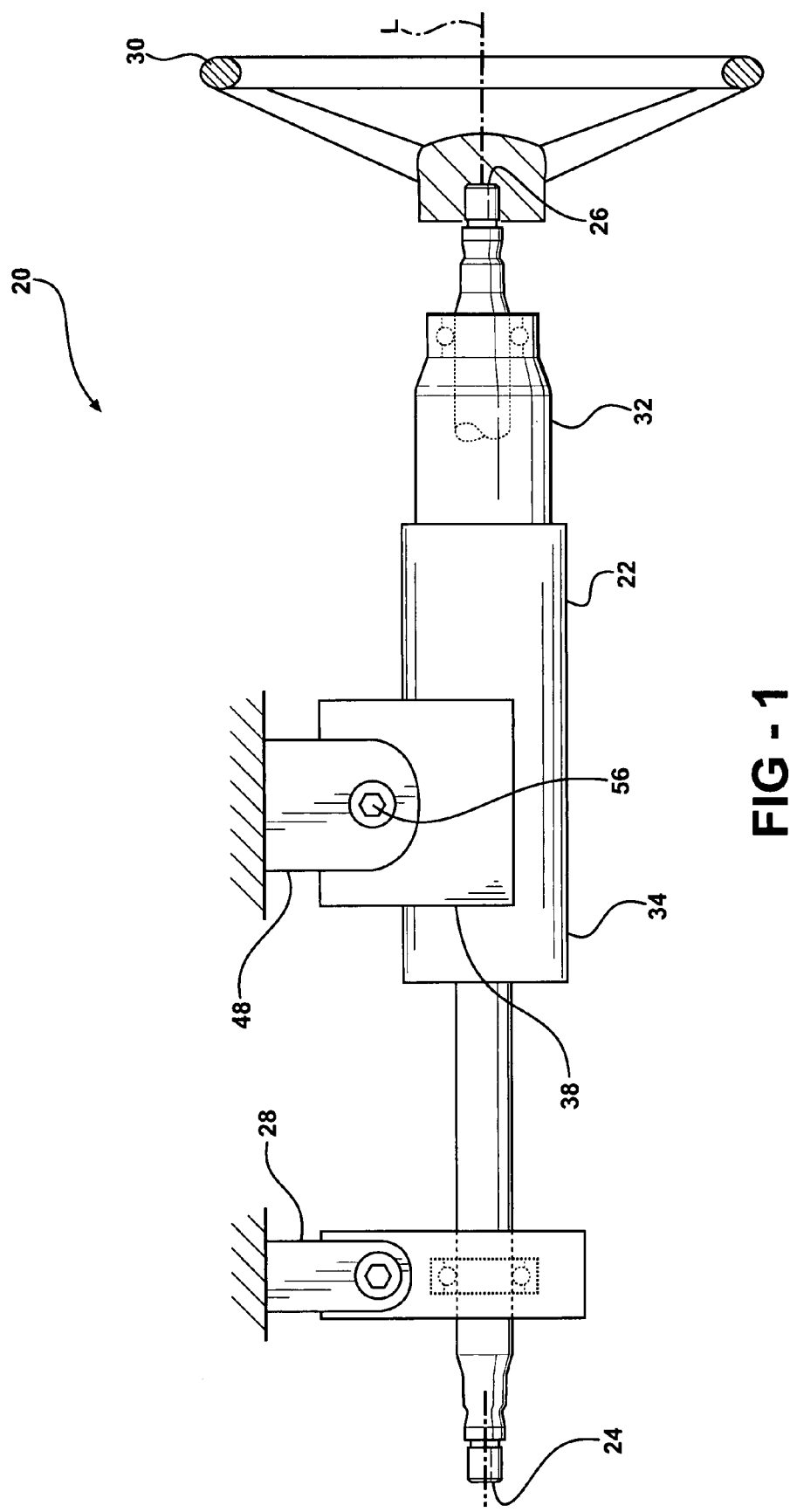
FIG. 1 is a schematic elevation view of a steering column assembly.

Referring to the Figures, wherein like numerals indicate corresponding parts throughout the several views, a steering column assembly 20 is generally shown referring to FIG. 1, the steering column assembly 20 is for a vehicle and extends along a longitudinal axis L. The steering column assembly 20 is adjustable in both a rake direction generally transverse to the longitudinal axis L (tilt), and also adjustable in a telescope direction parallel the longitudinal axis L, i.e., axially adjustable along the longitudinal axis L.

The steering column assembly 20 comprises a column jacket 22. The column jacket 22 extends from a forward end 24 to a distal end 26 adjacent a support bracket 28 along the longitudinal axis L. A steering wheel 30 is mounted to the distal end 26 of the column jacket 22 as is well known in the art. The column jacket 22 includes an inner jacket 32 in telescopic engagement with an outer jacket 34. During an emergency event, such as a vehicular crash, the inner jacket 32 collapses into the outer jacket 34 as is well known in the art. An energy absorbing device is coupled to the steering column assembly 20 to absorb energy transmitted through the column jacket 22 during collapse of the column jacket 22. There are many known energy absorbing devices known in the art suitable for use with the steering column assembly 20 of the subject invention.

Figure 2:
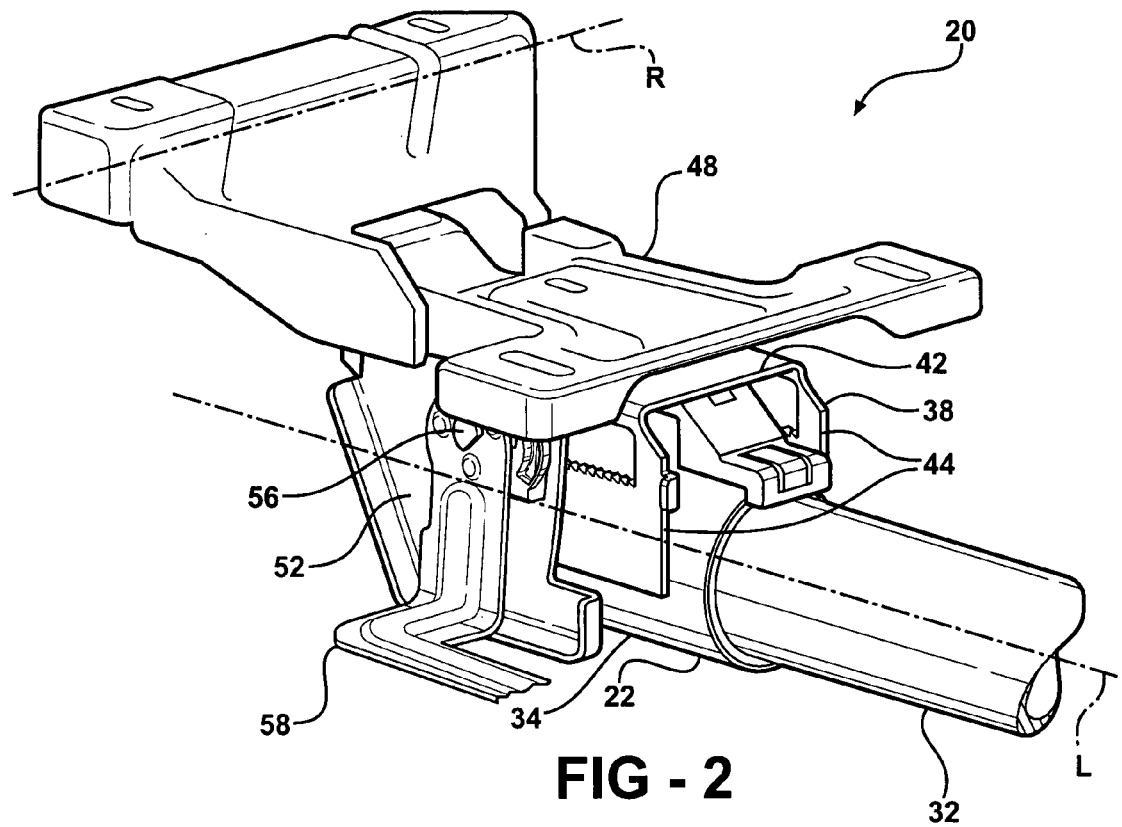
FIG. 2 is a perspective view of the steering column assembly in a lock position.
Figure 3:
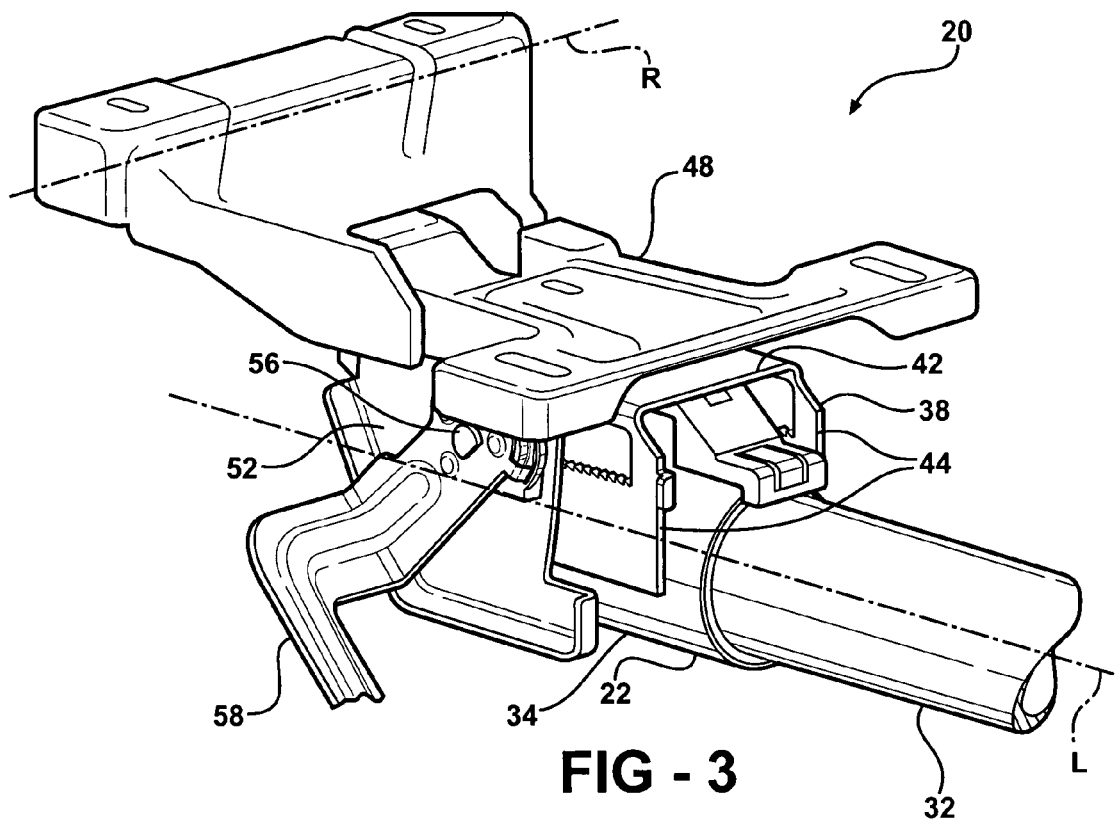
FIG. 3 is a perspective view of the steering column assembly in an adjustment position.

The support bracket 28 is for attachment to the vehicle. The column jacket 22 is coupled to the support bracket 28 and extends along the longitudinal axis L. The support bracket 28 couples the column jacket 22 to the vehicle. The support bracket 28 defines a rake axis R, shown in FIGS. 2 and 3. The column jacket 22 is pivotably moveable relative to the support bracket 28 about the rake axis R in the rake direction (tilt) to adjust a position of the steering wheel 30.

Referring to FIGS. 2 through 10, the steering column assembly 20 further comprises a compression bracket 38. The compression bracket 38 is mounted to the column jacket 22, and defines a telescope slot 40 parallel to the longitudinal axis L, best shown in FIGS. 4 and 5. The compression bracket 38 includes a top wall 42 spaced from the column jacket 22 and a pair of flanges 44 extending tangentially from opposing sides of the column jacket 22 to the top wall 42. Preferably, the telescope slot 40 includes a first telescope slot 40 defined by one of the pair of flanges 44 and a second telescope slot 40 defined by another of the pair of flanges 44. However, it should be appreciated that only one of the pair of flanges 44 need define the telescope slot 40.

A telescope tooth rack 46 is disposed in the telescope slot 40. The telescope tooth rack 46 is preferably integrally formed with the flange 44 of the compression bracket 38. However, it should be appreciated that the telescope tooth rack 46 may be separately formed from the compression bracket 38 and mounted to the compression bracket 38 in the telescope slot 40. The telescope slot 40 includes a lower edge, with the telescope tooth rack 46 being disposed on the lower edge of the telescope slot 40.

Figure 6:
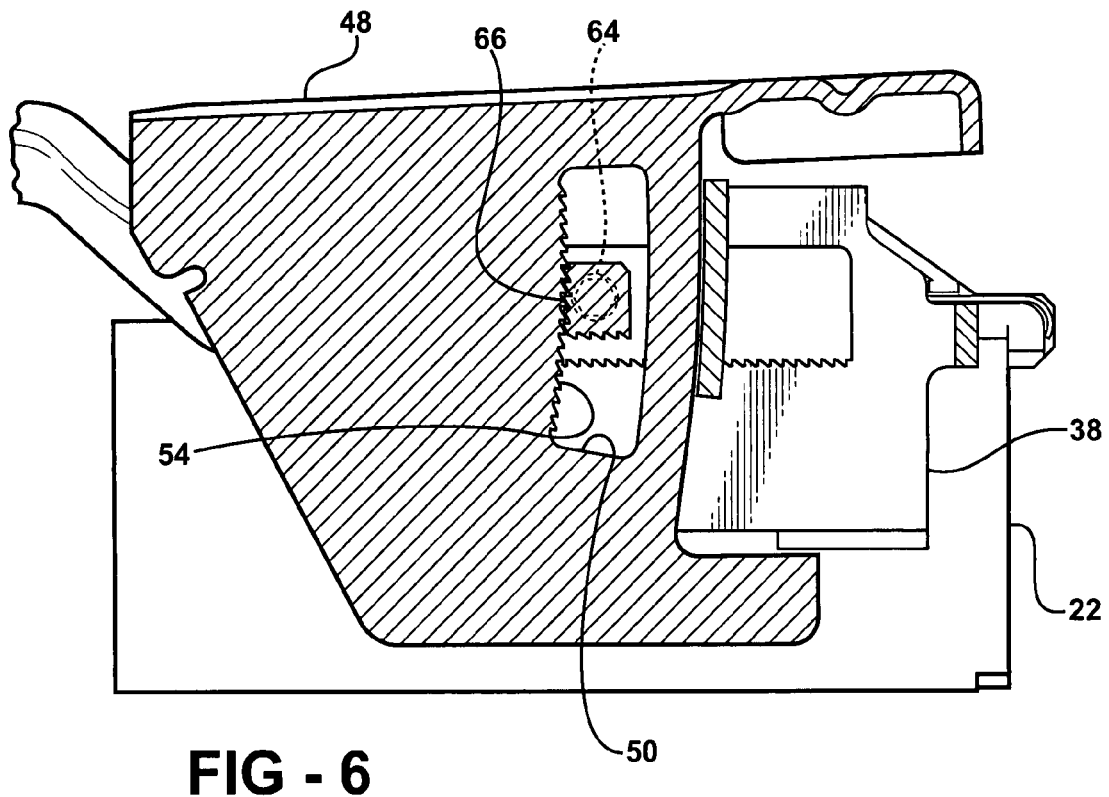
FIG. 6 is a partial fragmentary elevation view of the steering column assembly showing a rake lock in engagement with a rake tooth rack in the lock position.
Figure 7:
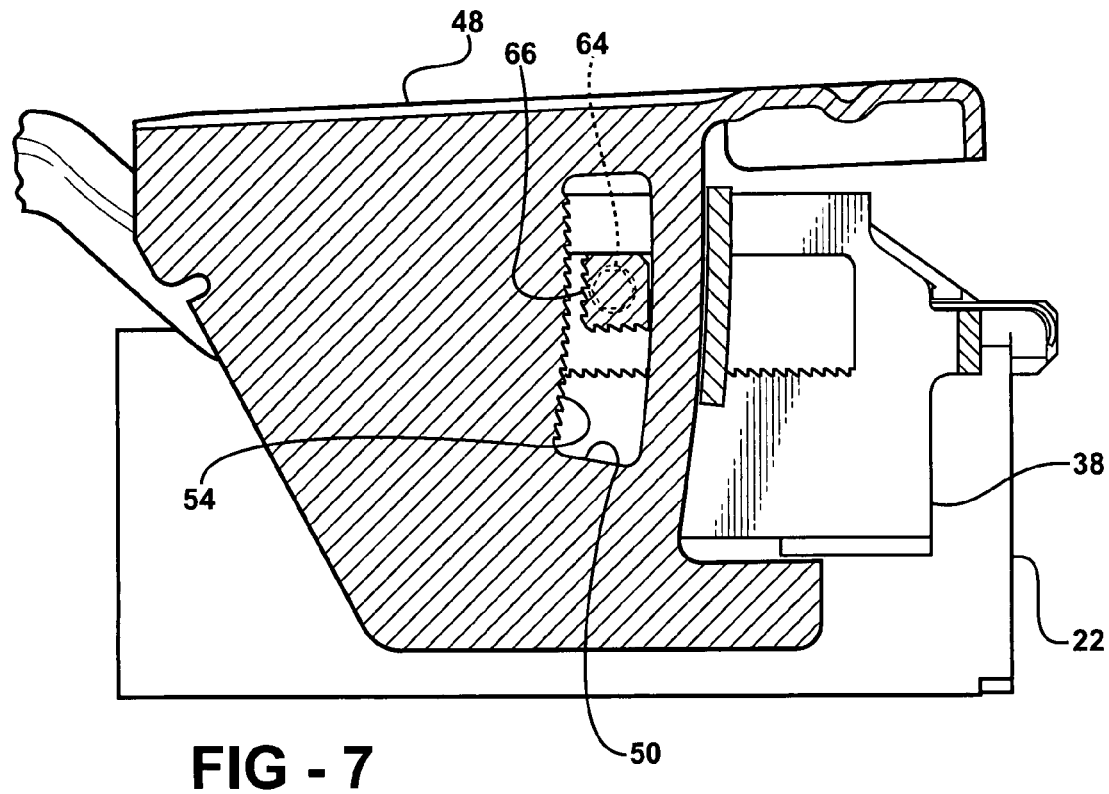
FIG. 7 is a partial fragmentary elevation view of the steering column assembly showing the rake lock disengaged from the rake tooth rack in the adjustment position.

A rake bracket 48 is coupled to the compression bracket 38, and couples the column jacket 22 to the vehicle. As best shown in FIGS. 6 and 7, the rake bracket 48 defines a rake slot 50 transverse to the longitudinal axis L. The rake slot 50 is spaced across the column jacket 22 from the telescope slot 40, and is generally perpendicular relative to the telescope slot 40. The rake bracket 48 includes a pair of arms 52 in overlapping parallel engagement with the pair of flanges 44 of the compression bracket 38. Preferably, the rake slot 50 includes a first rake slot 50 defined by one of the pair of arms 52 and a second rake slot 50 defined by another of the pair of arms 52. However, it should be appreciated that only one of the pair of arms 52 need define the rake slot 50, so long as the rake slot 50 is disposed on an opposite side of the column jacket 22 from the telescope slot 40.

A rake tooth rack 54 is disposed in the rake slot 50. The rake tooth rack 54 is preferably formed with the arm 52 of the rake bracket 48. However, it should be appreciated that the rake tooth rack 54 may be separately formed from the rake bracket 48 and mounted to the rake bracket 48 in the rake slot 50. The rake slot 50 includes a front edge, with the rake tooth rack 54 being disposed on the front edge of the rake slot 50.

Figure 10:
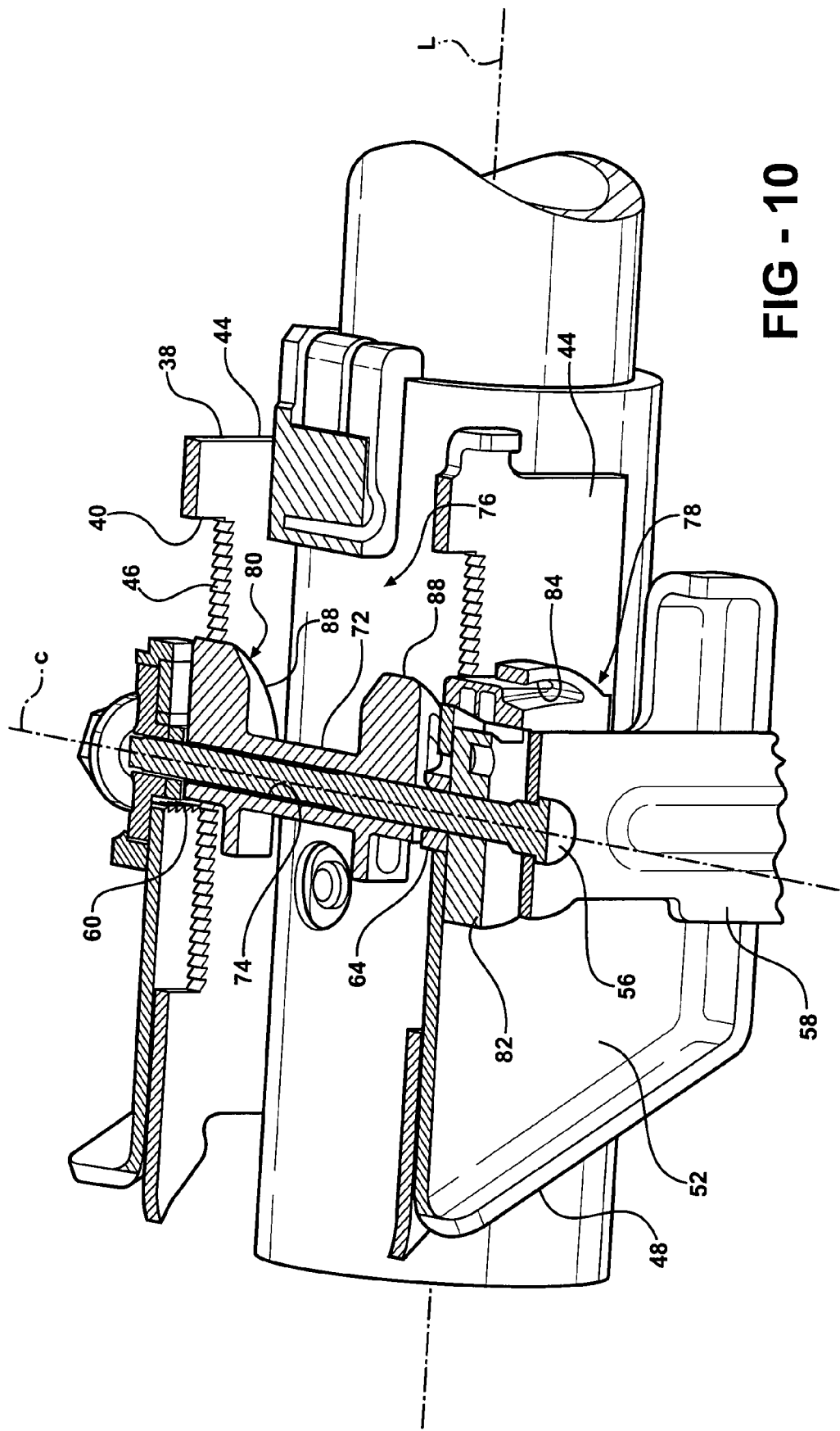
FIG. 10 is a partial fragmentary perspective view of the steering column assembly.

As best shown in FIG. 10, a rake bolt 56 extends transverse to the longitudinal axis L through the rake slot 50 and the telescope slot 40. The rake bolt 56 is moveable between a lock position and an adjustment position. A lever 58 is coupled to the rake bolt 56 for rotating the rake bolt 56 about a central axis C between the lock position and the adjustment position.

Figure 4:
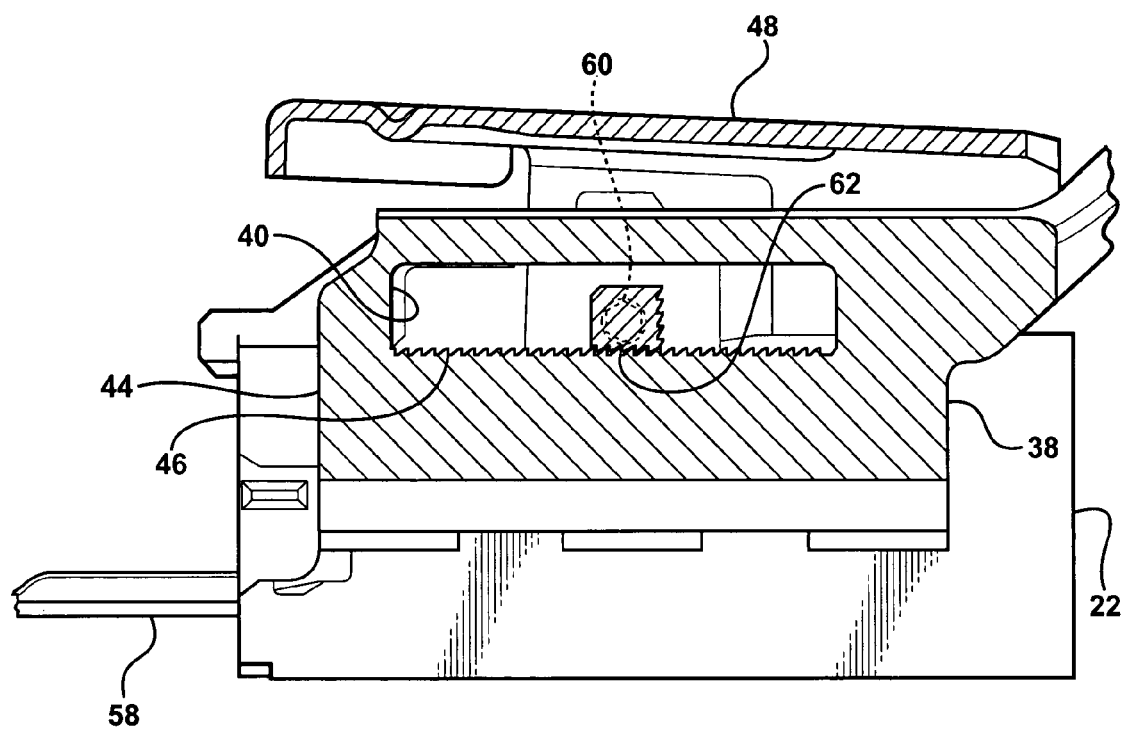
FIG. 4 is a partial fragmentary elevation view of the steering column assembly showing a telescope lock in engagement with a telescope tooth rack in the lock position.
Figure 5:
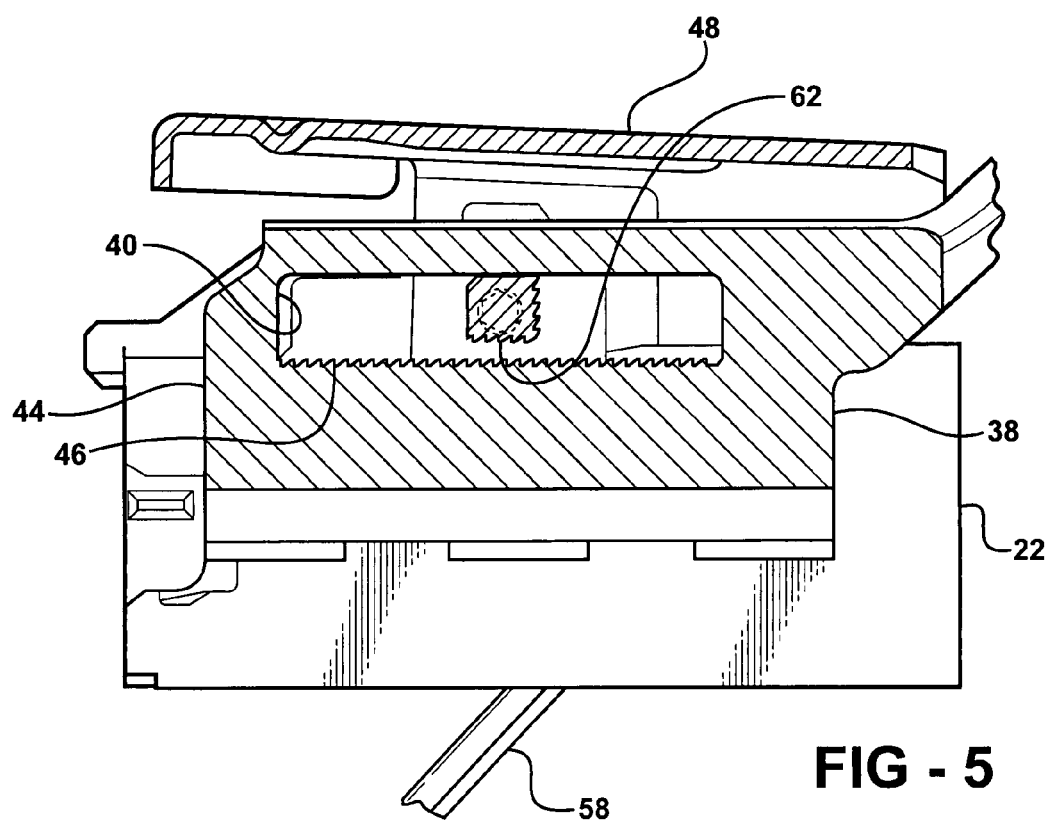
FIG. 5 is a partial fragmentary elevation view of the steering column assembly showing the telescope lock disengaged form the telescope tooth rack in the adjustment position.

As best shown in FIGS. 4 and 5, a telescope lock 60 is disposed in the telescope slot 40. The telescope lock 60 is moveable with the rake bolt 56 between the lock position and the adjustment position. The telescope lock 60 includes a plurality of telescope teeth 62 in interlocking engagement with the telescope tooth rack 46 when in the lock position. The telescope teeth 62 of the telescope lock 60 are in disengagement with the telescope tooth rack 46 when in the adjustment position.

As best shown in FIGS. 6 and 7, a rake lock 64 is disposed in the rake slot 50. The rake lock 64 is moveable with the rake bolt 56 between the lock position and the adjustment position. The rake lock 64 includes a plurality of rake teeth 66 in interlocking engagement with the rake tooth rack 54 when in the lock position. The rake teeth 66 of the rake lock 64 are in disengagement with the rake tooth rack 54 when in the adjustment position.

Referring back to FIG. 10, the rake bolt 56 includes a first end and a second end spaced from the first end. The rake lock 64 is mounted to the rake bolt 56 near one of the first end and the second end. The telescope lock 60 is mounted to the rake bolt 56 near the other of the first end and the second end. It should be appreciated that the rake lock 64 and the telescope lock 60 may be disposed at either end of the rake bolt 56, so long as the rake lock 64 and the telescope lock 60 are disposed at opposite ends of the rake bolt 56 and on opposite sides of the column jacket 22.

The steering column assembly 20 further comprises a spacer bracket 72. The spacer bracket 72 is disposed between the flanges 44 of the compression bracket 38 and extends between the rake slot 50 on one side of the column jacket 22 and the telescope slot 40 on the other side of the column jacket 22. The spacer bracket 72 defines a central bore 74, with the rake bolt 56 passing through the central bore 74 between the rake slot 50 and the telescope slot 40.

The steering column assembly 20 further comprises a cam mechanism 76 coupled to the rake bolt 56. The cam mechanism 76 manipulates the movement of the rake bolt 56 for simultaneously moving the rake lock 64 along the longitudinal axis L and the telescope lock 60 transverse to the longitudinal axis L. More specifically, the cam mechanism 76 includes a first cam mechanism 78 for moving the rake lock 64 along the longitudinal axis L and a second cam mechanism 80 for moving the telescope lock 60 transverse to the longitudinal axis L.

The first cam mechanism 78 is disposed adjacent the rake lock 64 near one of the first end and the second end of the rake bolt 56. The second cam mechanism 80 is disposed adjacent the telescope lock 60 near the other of the first end and the second end of the rake bolt 56. Accordingly, the first cam mechanism 78 moves the rake bolt 56 adjacent the rake lock 64 parallel the longitudinal axis L to move the rake lock 64 into engagement with the rake tooth rack 54 when moved into the lock position, and to move the rake lock 64 out of engagement with the rake tooth rack 54 when moved into the adjustment position. Similarly, the second cam mechanism 80 moves the rake bolt 56 adjacent the telescope lock 60 transverse to the longitudinal axis L to move the telescope lock 60 into engagement with the telescope tooth rack 46 when moved into the lock position, and to move the telescope lock 60 out of engagement with the telescope tooth rack 46 when moved into the adjustment position.

Figure 8:
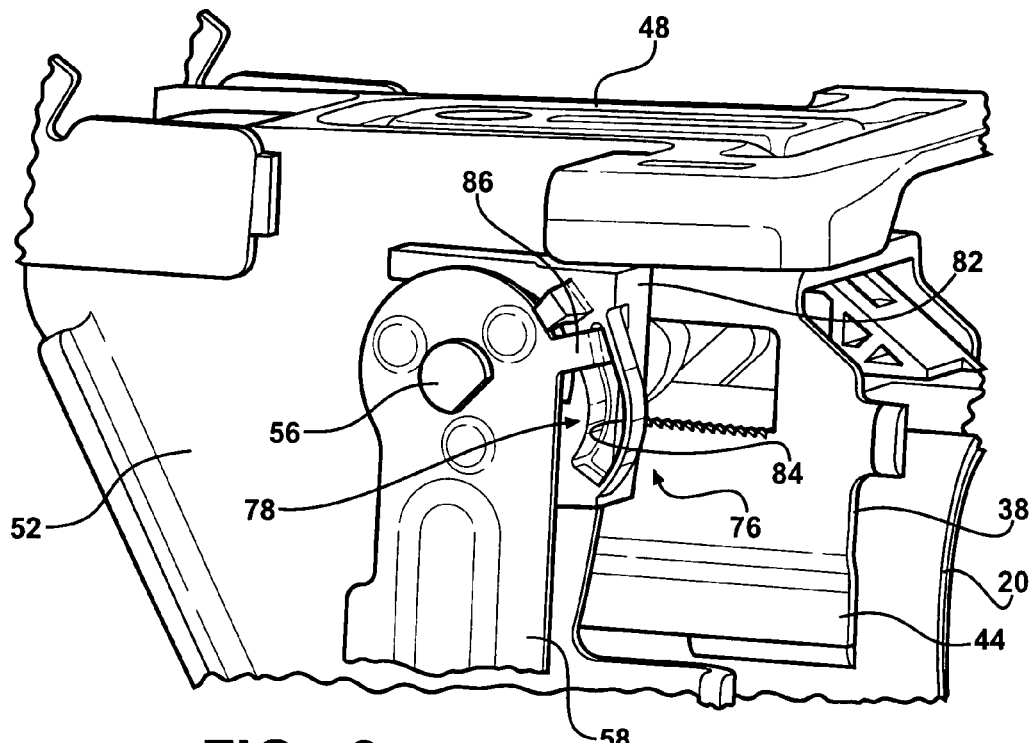
FIG. 8 is a fragmentary perspective view of the steering column assembly in the lock position.
Figure 9:
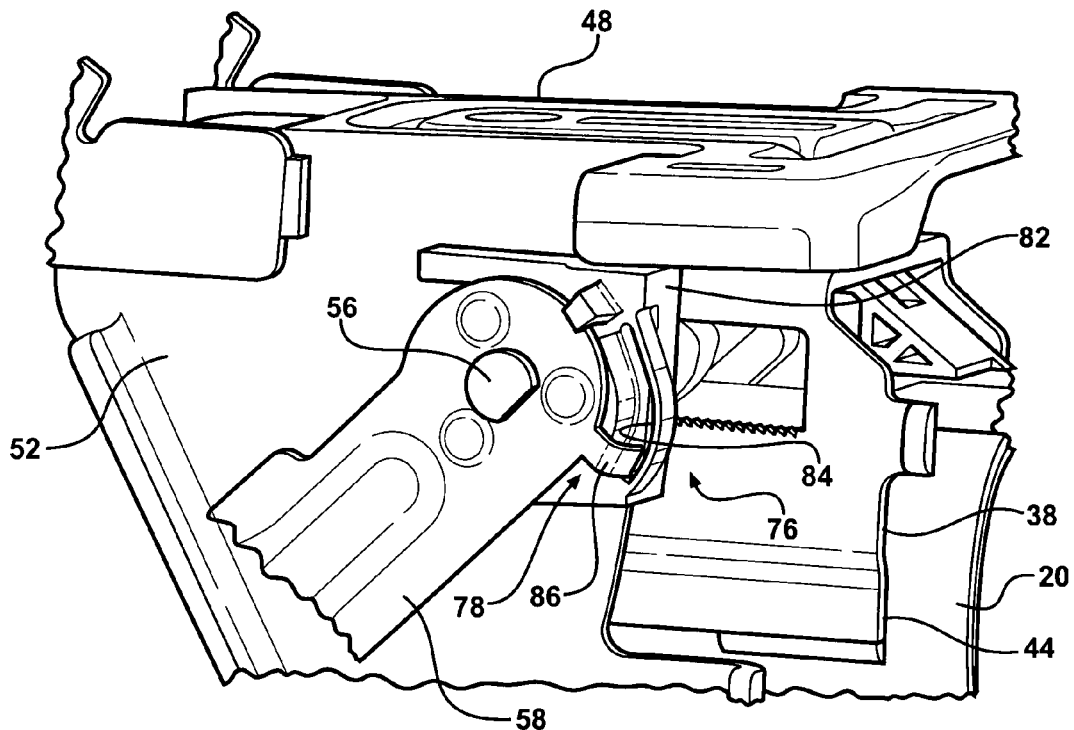
FIG. 9 is a fragmentary perspective view of the steering column assembly in the adjustment position.

As best shown in FIGS. 8 and 9, the first cam mechanism 78 includes a guide retainer 82 mounted to the rake bracket 48. Preferably, and as shown in the Figures, the guide retainer 82 is mounted adjacent the lever 58 on a lever 58 side of the column jacket 22.

The first cam mechanism 78 further includes a cam slot 84 defined by one of the lever 58 and the guide retainer 82, and a tab 86 disposed on the other of the lever 58 and the guide retainer 82. The tab 86 is in engagement with the cam slot 84, and moves the rake lock 64 into engagement with the rake tooth rack 54 in response to rotation of the rake bolt 56 from the adjustment position to the lock position. The tab 86 also moves the rake lock 64 out of engagement with the rake tooth rack 54 for disengaging the rake lock 64 from the rake tooth rack 54 in response to rotation of the rake bolt 56 from the lock position to the adjustment position.

Figure 12:
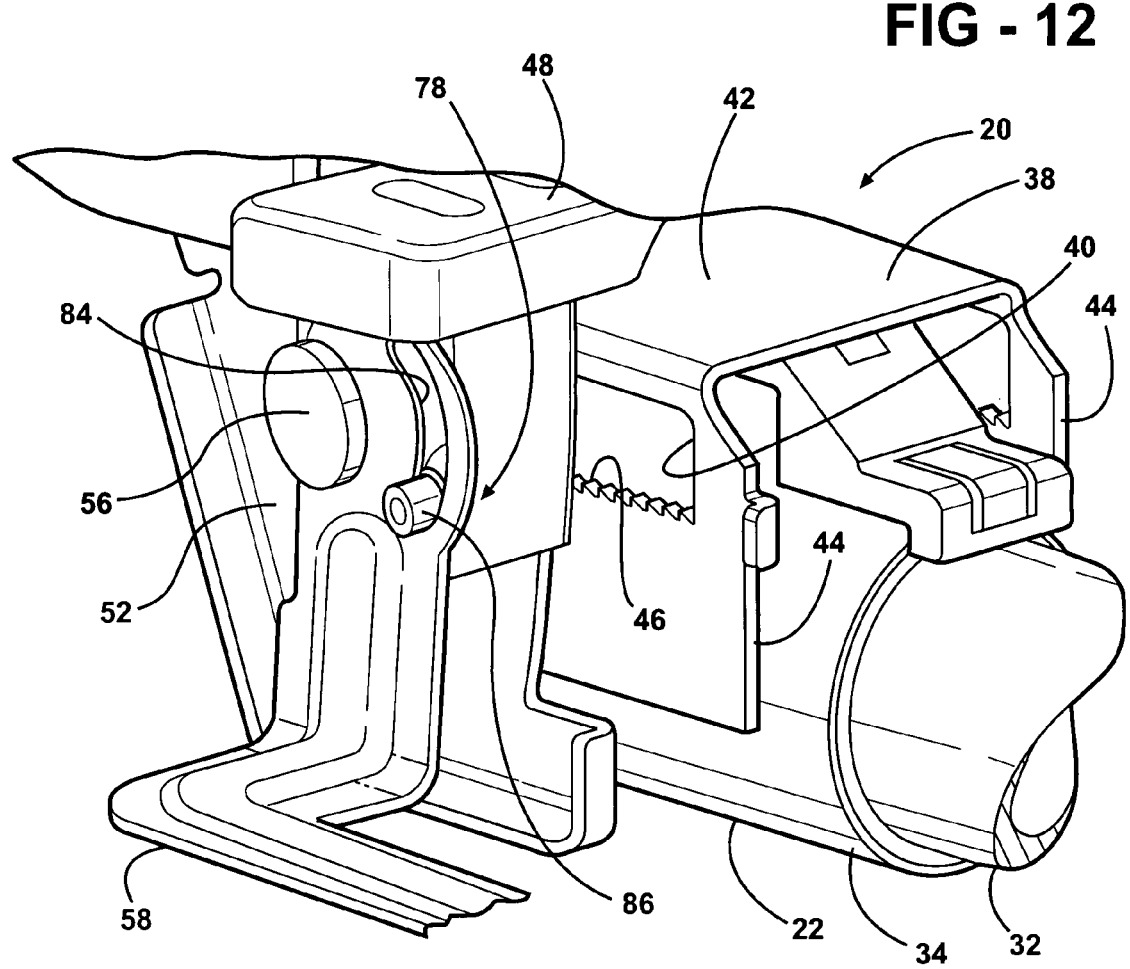
FIG. 12 is a partial perspective view of a first alternative embodiment of the steering column assembly.

It should be appreciated that the cam slot 84 may be disposed on either the guide retainer 82 or the lever 58, with the tab 86 being disposed on the other of the guide retainer 82 or the lever 58. As shown in FIGS. 2, 3, 8, 9 and 10, the cam slot 84 is disposed on the guide retainer 82 and the tab 86 is disposed on the lever 58. A first alternative embodiment of the steering column assembly 20 is shown in FIG. 12, in which the cam slot 84 is disposed on the lever 58 and the tab 86 is disposed on the guide retainer 82.

Figure 11:
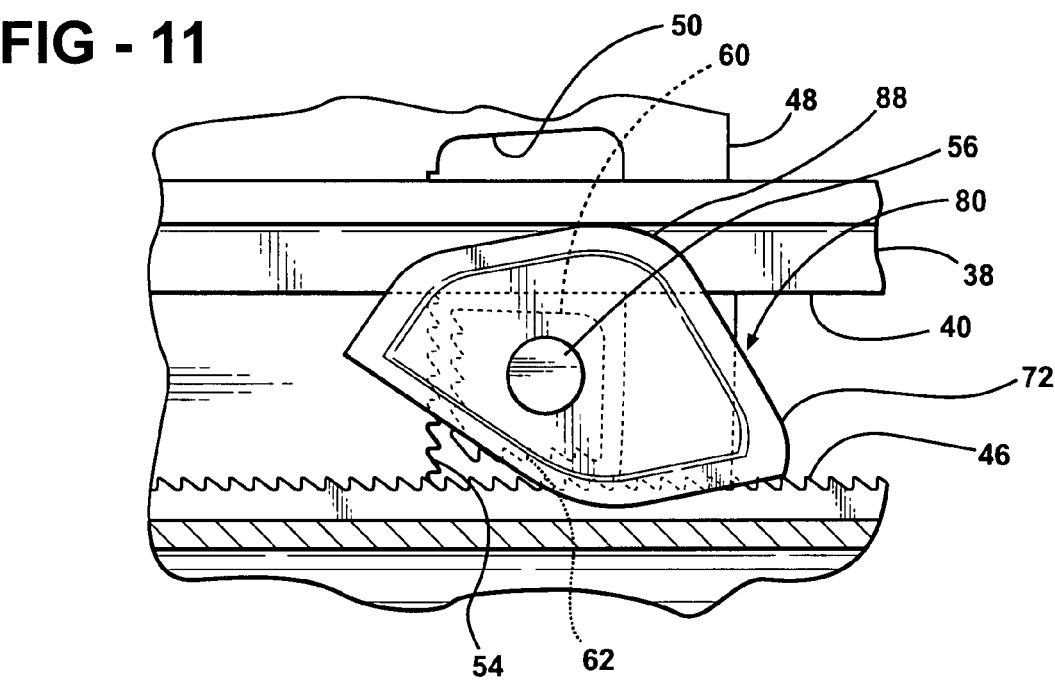
FIG. 11 is a partial fragmentary elevation view of a second cam mechanism of the steering column assembly.

Referring to FIG. 11, the spacer bracket 72 is coupled to the rake bolt 56, and is rotatable with the rake bolt 56 between the lock position and the adjustment position. The second cam mechanism 80 includes a cam lift 88 disposed on the spacer bracket 72. The cam lift 88 is rotatable with the spacer bracket 72 into engagement with the top wall 42 for engaging the telescope lock 60 with the telescope tooth rack 46 in response to rotation of the rake bolt 56 from the lock position to the adjustment position. The cam lift 88 also moves the telescope lock 60 out of engagement with the telescope tooth rack 46 for disengaging the telescope lock 60 from the telescope tooth rack 46 in response to rotation of the rake bolt 56 from the lock position to the adjustment position. The cam lift 88 is disposed near the telescope lock 60. As shown in FIG. 10, the cam lift 88 includes a first cam lift 88 disposed adjacent one of the pair of flanges 44 and a second cam lift 88 disposed adjacent another of the pair of flanges 44.

Figure 13:
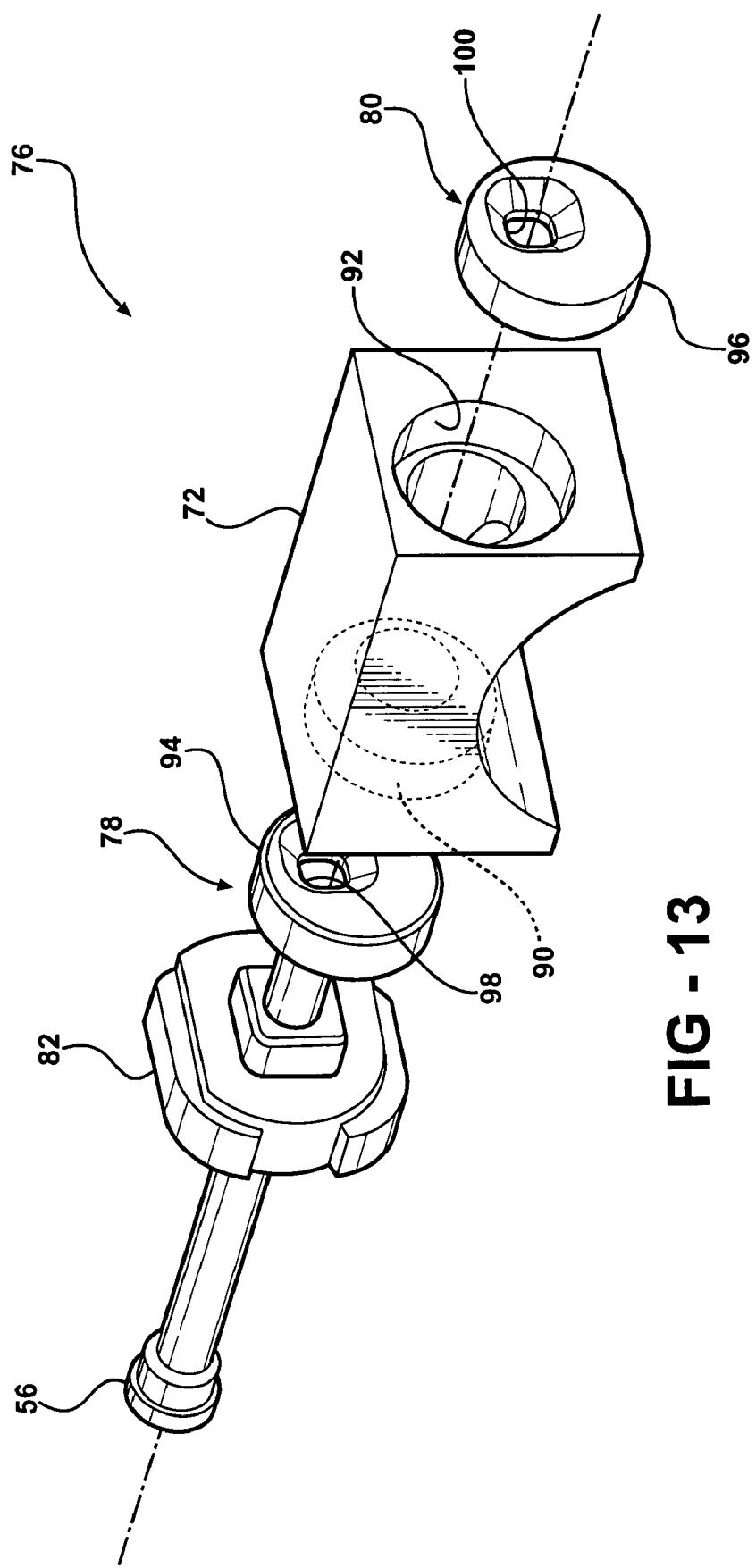
FIG. 13 is an exploded perspective view of a cam mechanism of a second alternative embodiment of the steering column assembly.
Figure 14:
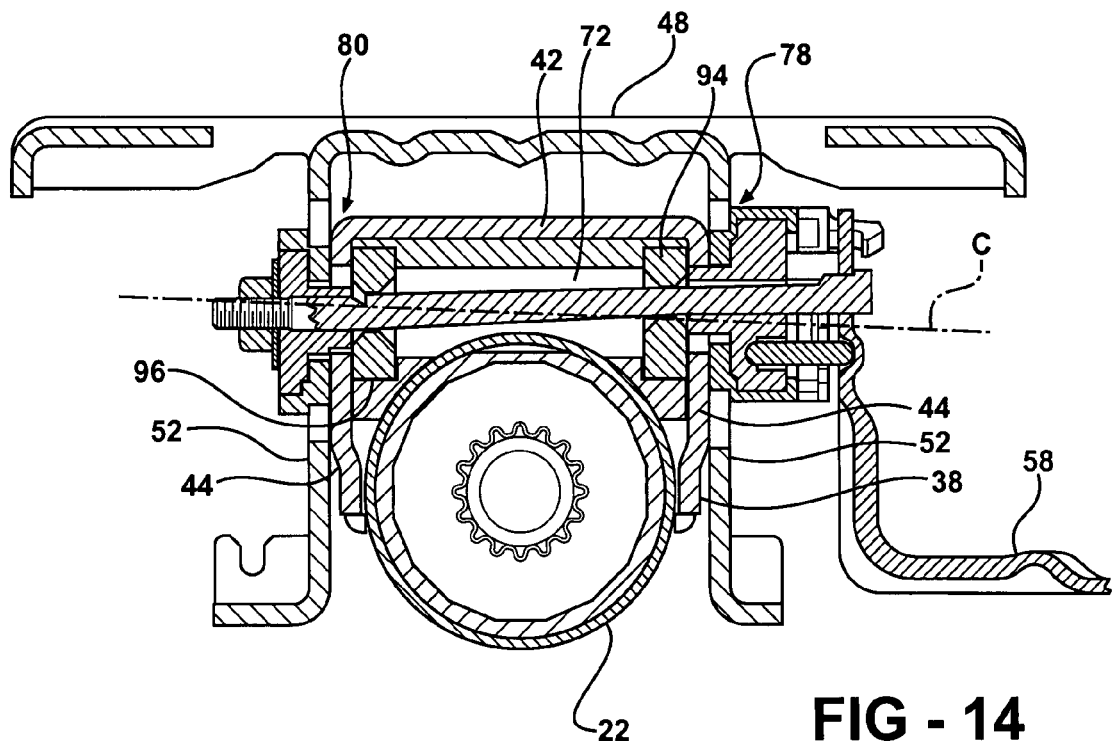
FIG. 14 is a cross-sectional view of the steering column assembly in the lock position.
Figure 15:
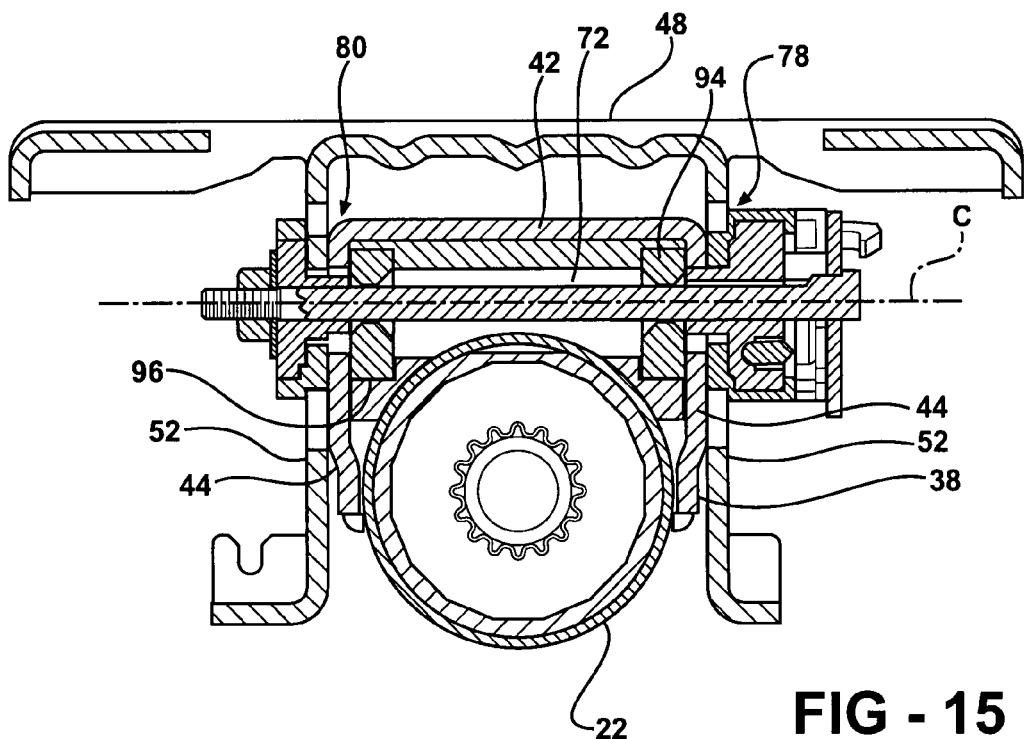
FIG. 15 is a cross-sectional view of the steering column assembly in the adjustment position.

Referring to FIGS. 13 through 15, a second alternative embodiment of the steering column assembly 20 is shown. The second alternative embodiment of the steering column assembly 20 includes the central bore 74 of the spacer bracket 72 having a cross section greater in size than the rake bolt 56. The larger cross-section of the central bore 74 permits lateral movement of the rake bolt 56 within the central bore 74 along the longitudinal axis L and transverse to the longitudinal axis L. Accordingly, it should be appreciated that the spacer bracket 72 does not rotate with the rake bolt 56 in the second alternative embodiment.

As best shown in FIG. 13, the spacer bracket 72 defines a rake recess 90 adjacent the rake lock 64 and a telescope recess 92 adjacent the telescope lock 60. As such, the rake recess 90 and the telescope recess 92 are spaced apart from each other and are disposed at opposite ends of the spacer bracket 72. The rake recess 90 and the telescope recess 92 are annular depressions formed in each end of the spacer bracket 72, and are concentric with the central axis C, i.e., the center of the rake recess 90 and the telescope recess 92 are concentric with the central axis C.

The first cam mechanism 78 of the second alternative embodiment includes an annular rake bushing 94 disposed in the rake recess 90 for effecting movement of the rake bolt 56 along the longitudinal axis L to move the rake lock 64 into and out of engagement with the rake tooth rack 54. The second cam mechanism 80 of the second alternative embodiment includes an annular telescope bushing 96 disposed in the telescope recess 92 for effecting movement of the rake bolt 56 transverse to the longitudinal axis L to move the telescope lock 60 into and out of engagement with the telescope tooth rack 46.

The annular rake bushing 94 and the annular telescope bushing 96 are mounted to the rake bolt 56 and rotatable with the rake bolt 56 as the rake bolt 56 moves between the lock position and the adjustment position. Additionally, the central axis C extends through a center of the rake bushing and a center of the telescope bushing. As such, the centers of the rake bushing and the telescope bushing are concentric with the rake recess 90 and the telescope recess 92 respectively, as well as the central axis C.

The annular rake bushing 94 includes a rake aperture 98 offset from the center of the annular rake bushing 94. The annular telescope bushing 96 includes a telescope aperture 100 offset from the center of the annular telescope bushing 96. In other words, the rake aperture 98 and the telescope aperture 100 are eccentric, i.e., not concentric with the rake bushing and the telescope bushing respectively. The rake bolt 56 extends through the rake aperture 98 and the telescope aperture 100. The rake aperture 98 and the telescope aperture 100 are rotated about the central axis C forty five degrees (45°) relative to each other. The rake aperture 98 is disposed above the center of the annular rake bushing 94 relative to the column jacket 22 in the adjustment position and the telescope aperture 100 is spaced from the rake aperture 98 along the longitudinal axis L nearer the rake axis R in the adjustment position.

As best shown with reference to FIGS. 14 and 15, as the rake bolt 56 is rotated when moving between the lock position and the adjustment position, the rake bolt 56 rotates about the central axis C, which extends through the centers of the rake bushing and the telescope bushing. This is because the rake aperture 98 and the telescope aperture 100 are offset from the central axis C. By rotating the rake aperture 98 approximately forty five degrees (45°) relative to the telescope aperture 100, and properly positioning the rake aperture 98 and the telescope aperture 100 as descrybed above, the rake bolt 56 moves generally vertically adjacent the telescope bushing and mores generally horizontally adjacent the rake bushing when moving between the lock position and the telescope position.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:

a support bracket for attachment to the vehicle;

a column jacket coupled to said support bracket and extending along a longitudinal axis and pivotably moveable relative to said support bracket about a rake axis;

a compression bracket mounted to said column jacket and defining a telescope slot parallel to said longitudinal axis;

a telescope tooth rack disposed in said telescope slot;

a rake bracket coupled to said compression bracket and defining a rake slot transverse to said longitudinal axis and spaced across said column jacket from said telescope slot and generally perpendicular relative to said telescope slot;

a rake tooth rack disposed in said rake slot;

a rake bolt extending transverse to said longitudinal axis through said rake slot and said telescope slot and moveable between a lock position and an adjustment position;

a rake lock disposed in said rake slot and moveable with said rake bolt between said lock position and said adjustment position and including a plurality of rake teeth in interlocking engagement with said rake tooth rack when in said lock position and in disengagement with said rake tooth rack when in said adjustment position;

a telescope lock disposed in said telescope slot and moveable with said rake bolt between said lock position and said adjustment position and including a plurality of telescope teeth in interlocking engagement with said telescope tooth rack when in said lock position and in disengagement with said telescope tooth rack when in said adjustment position; and a cam mechanism coupled to said rake bolt and manipulating said movement of said rake bolt for simultaneously moving said rake lock along said longitudinal axis and said telescope lock transverse to said longitudinal axis.

2. An assembly as set forth in claim 1 wherein said telescope slot includes a lower edge and said telescope tooth rack is disposed on said lower edge.

3. An assembly as set forth in claim 1 wherein said rake slot includes a front edge and said rake tooth rack is disposed on said front edge.

4. A steering column assembly for a vehicle, said assembly comprising:

a support bracket for attachment to the vehicle;

a column jacket coupled to said support bracket and extending along a longitudinal axis and pivotably moveable relative to said support bracket about a rake axis;

a compression bracket mounted to said column jacket and defining a telescope slot parallel to said longitudinal axis;

a telescope tooth rack disposed in said telescope slot;

a rake bracket coupled to said compression bracket and defining a rake slot transverse to said longitudinal axis and spaced across said column jacket from said telescope slot and generally perpendicular relative to said telescope slot;

a rake tooth rack disposed in said rake slot;

a rake bolt extending transverse to said longitudinal axis through said rake slot and said telescope slot and moveable between a lock position and an adjustment position;

a rake lock disposed in said rake slot and moveable with said rake bolt between said lock position and said adjustment position and including a plurality of rake teeth in interlocking engagement with said rake tooth rack when in said lock position and in disengagement with said rake tooth rack when in said adjustment position;

a telescope lock disposed in said telescope slot and moveable with said rake bolt between said lock position and said adjustment position and including a plurality of telescope teeth in interlocking engagement with said telescope tooth rack when in said lock position and in disengagement with said telescope tooth rack when in said adjustment position; and a cam mechanism coupled to said rake bolt and manipulating said movement of said rake bolt for simultaneously moving said rake lock along said longitudinal axis and said telescope lock transverse to said longitudinal axis;

wherein said cam mechanism includes a first cam mechanism for moving said rake lock along said longitudinal axis and a second cam mechanism for moving said telescope lock transverse to said longitudinal axis.

5. An assembly as set forth in claim 4 further comprising a spacer bracket defining a central bore passing said rake bolt through said central bore between said rake slot and said telescope slot.

6. An assembly as set forth in claim 5 further comprising a lever coupled to said rake bolt for rotating said rake bolt about a central axis between said lock position and said adjustment position.

7. An assembly as set forth in claim 6 wherein said first cam mechanism includes a guide retainer mounted to said rake bracket adjacent said lever.

8. An assembly as set forth in claim 7 wherein said first cam mechanism includes a cam slot defined by one of said lever and said guide retainer and a further comprising a tab disposed on the other of said lever and said guide retainer in engagement with said cam slot for moving said rake lock into engagement with said rake tooth rack in response to rotation of said rake bolt from said adjustment position to said lock position and for disengaging said rake lock from said rake tooth rack in response to rotation of said rake bolt from said lock position to said adjustment position.

9. An assembly as set forth in claim 6 wherein said spacer bracket is coupled to said rake bolt and rotatable with said rake bolt between said lock position and said adjustment position.

10. An assembly as set forth in claim 9 wherein said compression bracket includes a top wall and said second cam mechanism includes a cam lift disposed on said spacer bracket and rotatable with said spacer bracket into engagement with said top wall for engaging said telescope lock with said telescope tooth rack in response to rotation of said rake bolt from said lock position to said adjustment position and disengaging said telescope lock from said telescope tooth rack in response to rotation of said rake bolt from said lock position to said adjustment position.

11. An assembly as set forth in claim 10 wherein said cam lift is disposed near said telescope lock.

12. An assembly as set forth in claim 11 wherein said compression bracket includes a pair of flanges extending tangentially from opposing sides of said column jacket to said top wall and said cam lift includes a first cam lift disposed adjacent one of said pair of flanges and a second cam lift disposed adjacent another of said pair of flanges.

13. An assembly as set forth in claim 6 wherein said central bore of said spacer bracket includes a cross section greater in size than said rake bolt to permit lateral movement of said rake bolt within said central bore along said longitudinal axis and transverse to said longitudinal axis.

14. An assembly as set forth in claim 13 wherein said spacer bracket defines a rake recess adjacent the rake lock and a telescope recess adjacent the telescope lock.

15. An assembly as set forth in claim 14 wherein said first cam mechanism includes an annular rake bushing disposed in said rake recess and said second cam mechanism includes an annular telescope bushing disposed in said telescope recess.

16. An assembly as set forth in claim 15 wherein said annular rake bushing includes a rake aperture offset from a center of said annular rake bushing and said annular telescope bushing includes a telescope aperture offset from a center of said annular telescope bushing.

17. An assembly as set forth in claim 16 wherein said rake aperture and said telescope aperture are rotated about said central axis forty five degrees relative to each other.

18. An assembly as set forth in claim 17 wherein said rake aperture is disposed above said center of said annular rake bushing relative to said column jacket in said adjustment position and said telescope aperture is spaced from said rake aperture along said longitudinal axis nearer said rake axis in said adjustment position.

19. An assembly as set forth in claim 4 wherein said rake bolt includes a first end and a second end spaced from said first end with said rake lock mounted to said rake bolt near one of said first end and said second end and said telescope lock mounted to said rake bolt near the other of said first end and said second end.

20. An assembly as set forth in claim 19 wherein said first cam mechanism is disposed adjacent said rake lock near one of said first end and said second end and said second cam mechanism is disposed adjacent said telescope lock near the other of said first end and said second end of said rake bolt.

21. A steering column assembly for a vehicle, said assembly comprising:
    a support bracket for attachment to the vehicle;
    a column jacket coupled to said support bracket and extending along a longitudinal axis and pivotably moveable relative to said support bracket about a rake axis;
    a compression bracket mounted to said column jacket and defining a telescope slot parallel to said longitudinal axis;
    a telescope tooth rack disposed in said telescope slot;
    a rake bracket coupled to said compression bracket and defining a rake slot transverse to said longitudinal axis and spaced across said column jacket from said telescope slot and generally perpendicular relative to said telescope slot;
    a rake tooth rack disposed in said rake slot;
    a rake bolt extending transverse to said longitudinal axis through said rake slot and said telescope slot and moveable between a lock position and an adjustment position;
    a rake lock disposed in said rake slot and moveable with said rake bolt between said lock position and said adjustment position and including a plurality of rake teeth in interlocking engagement with said rake tooth rack when in said lock position and in disengagement with said rake tooth rack when in said adjustment position;
    a telescope lock disposed in said telescope slot and moveable with said rake bolt between said lock position and said adjustment position and including a plurality of telescope teeth in interlocking engagement with said telescope tooth rack when in said lock position and in disengagement with said telescope tooth rack when in said adjustment position; and
    a cam mechanism coupled to said rake bolt and manipulating said movement of said rake bolt for simultaneously moving said rake lock along said longitudinal axis and said telescope lock transverse to said longitudinal axis;
    wherein said compression bracket includes a top wall spaced from said column jacket and a pair of flanges extending tangentially from opposing sides of said column jacket to said top wall and wherein said telescope slot includes a first telescope slot defined by one of said pair of flanges and a second telescope slot defined by another of said pair of flanges.

22. An assembly as set forth in claim 21 wherein said rake bracket includes a pair of arms in overlapping parallel engagement with said pair of flanges and wherein said rake slot includes a first rake slot defined by one of said pair of arms and a second rake slot defined by another of said pair of arms.

* * * * *